United States Patent
Wang et al.

(10) Patent No.: US 8,046,322 B2
(45) Date of Patent: Oct. 25, 2011

(54) METHODS AND FRAMEWORK FOR CONSTRAINT-BASED ACTIVITY MINING (CMAP)

(75) Inventors: Changzhou Wang, Bellevue, WA (US); Anne Kao, Bellevue, WA (US); Jai J. Choi, Sammamish, WA (US); Rodney A. Tjoelker, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 352 days.

(21) Appl. No.: 11/835,225

(22) Filed: Aug. 7, 2007

(65) Prior Publication Data

US 2009/0043766 A1      Feb. 12, 2009

(51) Int. Cl.
*G06F 17/30*     (2006.01)
*G06F 17/00*     (2006.01)

(52) U.S. Cl. .......... 706/48; 707/776; 707/756; 707/778; 707/792; 707/796; 707/694

(58) Field of Classification Search .................. 707/1, 3, 707/5–6, 100, 102, 103 Y, 103 Z, 600–603, 707/694, 705, 713, 725, 758, 769, 776–777, 707/780, 756, 778, 792, 962; 706/45–50, 706/909; 717/120, 100; 709/224; 715/736
See application file for complete search history.

(56) References Cited

U.S. PATENT DOCUMENTS

| | | | |
|---|---|---|---|
| 5,907,328 A | | 5/1999 | Brush, II et al. |
| 6,076,088 A | * | 6/2000 | Paik et al. ........................ 707/5 |
| 6,154,739 A | | 11/2000 | Wrobel |
| 6,272,478 B1 | * | 8/2001 | Obata et al. ..................... 706/12 |
| 6,493,723 B1 | * | 12/2002 | Busche ....................... 707/104.1 |
| 6,553,359 B1 | * | 4/2003 | Schwenkreis .................... 706/46 |
| 6,611,825 B1 | * | 8/2003 | Billheimer et al. ............. 706/45 |
| 6,697,802 B2 | * | 2/2004 | Ma et al. .............................. 1/1 |
| 6,701,305 B1 | * | 3/2004 | Holt et al. ....................... 706/45 |
| 6,990,486 B2 | * | 1/2006 | Ma et al. .............................. 1/1 |
| 7,003,517 B1 | * | 2/2006 | Seibel et al. ......................... 1/1 |
| 7,027,055 B2 | | 4/2006 | Anderson et al. |
| 7,047,226 B2 | | 5/2006 | Rubin |
| 7,085,683 B2 | | 8/2006 | Anderson et al. |
| 7,096,206 B2 | | 8/2006 | Hitt |
| 7,107,285 B2 | | 9/2006 | von Kaenel et al. |
| 7,124,438 B2 | | 10/2006 | Judge et al. |
| 7,146,384 B2 | | 12/2006 | Sawafta |

(Continued)

FOREIGN PATENT DOCUMENTS

EP     1329808    *    7/2003

(Continued)

OTHER PUBLICATIONS

Bart Goethals et al. "Relational Association Rules: Getting Warmer", Pattern Detection and Discovery, LNAI 2447, pp. 125-139, 2002.*

(Continued)

*Primary Examiner* — Srirama Channavajjala
(74) *Attorney, Agent, or Firm* — Armstrong Teasdale LLP

(57) ABSTRACT

A method of mining data to discover activity patterns within the data is described. The method includes receiving data to be mined from at least one data source, determining which of a number of specified interests and constraints are associated with the mining process, selecting corresponding mining agents that combine search algorithms with propagators from the specified constraints, and finding any activity patterns that meet the specified interests and constraints.

18 Claims, 16 Drawing Sheets

U.S. PATENT DOCUMENTS

| | | | |
|---|---|---|---|
| 7,240,038 | B2 | 7/2007 | Hitt |
| 7,447,666 | B2 * | 11/2008 | Wang .......................... 706/45 |
| 7,644,078 | B2 * | 1/2010 | Sastry et al. .................. 706/20 |
| 7,644,079 | B2 * | 1/2010 | Sastry et al. .................. 706/20 |
| 7,836,004 | B2 * | 11/2010 | Roth et al. .................... 706/47 |
| 7,882,128 | B2 * | 2/2011 | Bollinger et al. ............ 707/776 |
| 2002/0107841 | A1 * | 8/2002 | Hellerstein et al. ............... 707/3 |
| 2003/0217052 | A1 * | 11/2003 | Rubenczyk et al. ............ 707/3 |
| 2003/0217055 | A1 * | 11/2003 | Lee et al. ........................ 707/6 |
| 2004/0049499 | A1 * | 3/2004 | Nomoto et al. .................. 707/3 |
| 2004/0116783 | A1 * | 6/2004 | Weaver ........................ 600/300 |
| 2005/0071217 | A1 * | 3/2005 | Hoogs et al. .................... 705/10 |
| 2005/0177540 | A1 * | 8/2005 | Ankerst et al. ..................... 707/1 |
| 2006/0074824 | A1 * | 4/2006 | Li ................................. 706/20 |
| 2007/0100990 | A1 * | 5/2007 | Brown et al. ................. 709/224 |
| 2007/0156677 | A1 * | 7/2007 | Szabo ............................. 707/5 |
| 2007/0219992 | A1 * | 9/2007 | Bollinger et al. ................. 707/6 |

FOREIGN PATENT DOCUMENTS

| | | | |
|---|---|---|---|
| WO | WO 02/073529 | * | 9/2002 |
| WO | WO 2009/020727 | * | 2/2009 |

OTHER PUBLICATIONS

Ross D. Kinga, et al. "Warmr: a data mining tool for chemical data", Journal of Computer-Aided Molecular Design, 15: 173-181, 2001.*

Baptiste Jeudy et al. "Constraint-Based Discovery and Inductive Queries: Application to Association Rule Mining", Pattern Detection and Discovery, LNAI 2447, pp. 110-124, 2002.*

Jiawei Han et al. "Constraint-Based, Multidimensional Data Mining", IEEE 1999, pp. 46-50.*

Changzhou Wang, et al. "CMAP: a Flexible and Efficient Framework for Constraint-based Mining of Activity Patterns",12th International Conference on Information Fusion Seattle, WA, USA, Jul. 6-9, 2009, pp. 1451-1458.*

Duen-Ren Liu et al. "Designing a composite e-service platform with recommendation function", Computer Standards & Interfaces 25 (2003) 103-117.*

Annalisa Appice, et al. "Mining and Filtering Multi-level Spatial Association Rules with ARES", ISMIS 2005, LNAI 3488, pp. 342-353, 2005.*

Longbing Cao, et al. "Mining Impact-Targeted Activity Patterns in Imbalanced Data", IEEE Transactions on Knowledge and Data Engineering, vol. 20, No. 8, Aug. 2008, pp. 1053-1066.*

Linna Li, et al. "A Framework for Object-Oriented Data Mining", Fifth International Conference on Fuzzy Systems and Knowledge Discovery2008 IEEE pp. 60-64.*

Anthony J.T. Lee et al. "An efficient algorithm for mining frequent inter-transaction patterns", Information Sciences 177 (2007) 3453-3476.*

Ramachandra. V. Pujeri et al. "Constraint based frequent pattern mining for generalized query templates from web log", International Journal of Engineering, Science and Technology vol. 2, No. 11, 2010, pp. 17-33.*

International Search Report of PCT/US2008/069202; Nov. 27, 2008; 15 pages.

Xu, Wei et al; The Application of Spatial Data Mining in Railway Geographic Information Systems; IEEE Intelligent Transportation Systems, 2003; Oct. 12, 2003; pp. 1467-1471; vol. 2; Piscataway, NJ, USA.

Dehaspe, Luc et al.; Discovery of Relational Association Rules; Relational Data Mining; 2001; pp. 189-212; Springer-Verlag.

Balter, Julien et al.; A Knowledge-Driven Agent-Centred Framework for Data Mining in EMG; Comptes Rendus—Biologies; Apr. 1, 2002; pp. 375-389; vol. 325, No. 4; Elsevier, Paris, FR.

Francesca A. Lisi et al.; Inducing Multi-Level Associate Rules for Multiple Relations; Machine Learning; May 1, 2004; pp. 175-210; vol. 55, No. 2; Kluwer Academic Publishers—Plenum Publishers, NE.

Han, J. et al; Constraint-Based, Multidimensional Data Mining; IEEE Service Center; Aug. 1, 1999; pp. 46-50; vol. 32, No. 8; Los Alamitos, CA, US.

* cited by examiner

METHODS AND FRAMEWORK FOR CONSTRAINT-BASED ACTIVITY MINING (CMAP)

STATEMENT REGARDING FEDERALLY SPONSORED RESEARCH & DEVELOPMENT

The United States Government has acquired certain rights in this invention pursuant to Contract No. N00014-06-C-0018, issued by the Department of the Navy.

BACKGROUND OF THE INVENTION

This invention relates generally to data mining, and more specifically, to methods and framework for constraint-based activity mining (CMAP).

In many applications, including military surveillance, scientific data analysis, manufacturing processes, and business intelligence, human and/or machine activities have been recorded and analyzed. Often, discovery of recurrent patterns from such activities will provide invaluable insights and enable effective actions in these application domains.

Early studies, such as association rule mining and its variations, often assume that all data is stored in a single data table and hence ignore any complex structures among the data. Recently, the data mining community has recognized the need to discover patterns from multiple relational tables, since many datasets have been saved in relational databases for a long time.

Different approaches have been taken to discover such patterns. A generic approach is to consider a pattern as a logic clause. However, it is very challenging to develop an efficient algorithm to discover patterns of such generic form. Researchers have addressed this challenge by restricting the allowed forms of patterns and designing special algorithms to discover patterns of the restricted form.

A very common technique is to use "mode", first introduced in PROGOL. This often reduces the valid pattern space significantly, for example, up to a few orders of magnitude. However, a mode satisfaction test often depends on the order of pattern elements, which is usually not significant in determining the semantics of a pattern. For example, a mode on a close predicate can require any atom on close to use only variables introduced in predicates preceding it. This mode is satisfied by Example 2, but not by Example 3, (See Table 1 below) even though the two patterns are equivalent. Hence, the mode restriction must be carefully taken into account when designing the mining algorithms.

Often, the mode declaration also specifies the data type for predicate arguments. This data type specification further reduces the pattern search space. For example, the same variable in a pattern cannot assume two different types. In addition, a constant parameter in a pattern should have the correct type as specified by the corresponding predicate.

One known data mining tool, WARMR, adapts a mode constraint to discover frequent patterns in first-order logic form. Specifically, a pattern is a conjunction of positive literals. Even though WARMR exploits the mode constraints, which is sometimes referred to as bias, it does not perform or scale well due to the generic pattern formulation. On the other hand, there are some other specialized algorithms, e.g., to discover sequential patterns which are similar to Example 5 (if the starting and ending time of each action are collapsed into a single time point), or to discover sub-graphs which are similar to Example 1 (if airport is considered as node and fly as edge in a graph). Such specialized algorithms may be reasonably efficient, but the forms of restrictions are built into the algorithms, and cannot be extended to handle other forms.

WARMR first introduces the concept of a multi-relational activity pattern, called "query", as an extension to association rules. It uses a level-wise refinement framework similar to the APRIORI algorithm used in association rule mining. The major difference in the WARMR algorithm is in generation of new candidate patterns from existing ones. It uses the typical logic refinement operation: unify two variables, replace one variable by a constant, or add a new atom (a pattern element).

WARMR requires that atoms must satisfy mode constraints which in turn restricts the use of constants or variables in each argument. This helps to reduce the search space significantly. Unfortunately, due to the intrinsic large search space (note that an association rule is a degenerated pattern using atoms of a single predicate with a single constant argument), WARMR can only handle very small data sets (with small number of predicates and data records).

Another data mining tool, FARMER, improves WARMR with a more efficient algorithm. However, its assumption of unique object identifiers (OIs) in patterns prevents FARMER from discovering many interesting patterns. An improved version of FARMER relaxes the OI assumption (to a weak OI assumption) but sacrifices the efficiency of the original algorithm to some extent. However, even the weak-OI assumption is overly restrictive. For instance, and again referring to Table 1, Example 7 cannot be discovered by FARMER under the OI assumption. Example 7 and Example 8 cannot be discovered at the same time using FARMER under the weak OI assumption (since R has to be specified as OI to discover Example 8 and reverse the specification to discover Example 7). In addition, WARMR or FARMER does not consider other constraints.

FARMER improves WARMR by significantly reducing the number of generated candidate patterns, under the assumption that variables in a pattern are object identities (OIs). Two variables in the same pattern cannot take the same value assignment, and a variable cannot be assigned to a constant in the same pattern. For example, in pattern occur $(E_1, T_1)$, occur$(E_2, T_2)$, close$(T_1, T_2)$, the occurrence time of the two events $T_1$ and $T_2$ cannot be the same (even though they shall be close to each other) due to the OI requirement. With this OI assumption, FARMER uses a much simpler refinement operation, that is, FARMER always adds a new atom to the existing pattern in order to obtain a candidate pattern. Combined with the mode constraints, the refinement step in FARMER will generate much less redundant patterns than the WARMR algorithm. In addition, although not explicitly mentioned, FARMER assumes that all atoms in the pattern are "connected" through common variables shared by atoms. It actually exploits this assumption to add atoms that must use one variable in the existing pattern.

TABLE 1

| Example 1 | A person takes a round-trip flight: person(P)→fly(P, $A_1$ $T_1$, $A_2$, $T_2$), fly(P, $A_2$, $T_3$, $A_1$, $T_4$), $A_1 \neq A_2$. | Here, fly provides one hop flight information including the person who flies, the departure airport and time, |

TABLE 1-continued

| | | as well as the arrival airport and time. |
|---|---|---|
| Example 2 | A person takes a connected flight: person(P)→fly(P, $A_1$, $S_1$, $A_2$, $E_1$), fly(P, $A_2$, $S_2$, $A_3$, $E_2$), close($E_1$, $S_2$), $A_1 \neq A_3$. | |
| Example 3 | A person takes a connected flight: person(P)→close(T1, T2), fly(P, A1, T2, A2, T3), fly(P, A3, T4, A1, T1), A1 ≠ A3. | This pattern is equivalent to Example 2, since the order of the pattern elements or the name of the variables does not change the meaning of the pattern. |
| Example 4 | A person takes a connected flight: person(P)→fly(P, $A_2$, $S_2$, $A_3$, $E_2$), fly(P, $A_1$, $S_1$, $A_2$, $E_2$), close($S_2$, $E_1$), $A_1 \neq A_3$. | This pattern is equivalent to Example 2, since close is a symmetric relation, i.e., close($S_2$, $E_1$) is the same as close($E_1$, $S_2$). |
| Example 5 | A person takes a sequence of actions: person(P)→fly (P, $A_1$, $S_1$, $A_2$, $E_1$), drive(P, $L_1$, $S_2$, $L_2$, $E_2$), lodge(P, $L_3$, $S_3$, $E_3$), before($E_1$, $S_2$), before($E_2$, $S_3$). | Here L is the location in drive and lodge. |
| Example 6 | A frequent flier: person(P)→fly(P, S, E), count(S)/(max(S) − min(S) + 1) > 6. | Here max and min return the maximum and minimum year for all the flights (starting time) a person takes, and count returns the number of distinct flights (each has a different starting time). |
| Example 7 | A flight stops in two metropolitan airports: flight(F) →stop(F, $A_1$), airport($A_1$, $R_1$), region($R_1$, 'metro'), stop(F, $A_2$), airport($A_2$, $R_2$), region($R_2$, 'metro'), $A_1 \neq A_2$. | Note that the two metropolitan regions can be the same or different in this pattern. |
| Example 8 | A flight stops in two airports of two different metropolitan regions: flight(F) →stop(F, $A_1$), airport($A_1$, $R_1$), region($R_1$, 'metro'), stop(F, $A_2$), airport($A_2$, $R_2$), region($R_2$, 'metro'), $A_1 \neq A_2$, $R_1 \neq R_2$. | |

BRIEF DESCRIPTION OF THE INVENTION

In one aspect, a method of mining data to discover activity patterns within the data is provided. The method includes receiving data to be mined from at least one data source, determining which of a number of specified interests and constraints are associated with the mining task, selecting corresponding mining agents that combine search algorithms with propagators from the specified constraints, finding any activity patterns that meet the specified interests and constraints, and analyzing said activities patterns found to meet the specified interests and constraints.

In another aspect, a computer-based system for constraint-based mining of activity patterns within a framework is provided. The system comprises a data input, a plurality of data mining tools within the framework and operable to run on the system, the data mining tools configured to search data received at the data input for one or both of temporal and spatial patterns for activities of interest within one or more scenarios, a plurality of constraints, the constraints based on knowledge and experiences, and operable to cause the system to determine whether one or more patterns satisfies the constraints, the constraints organized based on a subsumption relationship among the constraints, and at least one database configured for operation as a pattern repository.

DETAILED DESCRIPTION OF THE INVENTION

Figure 1:
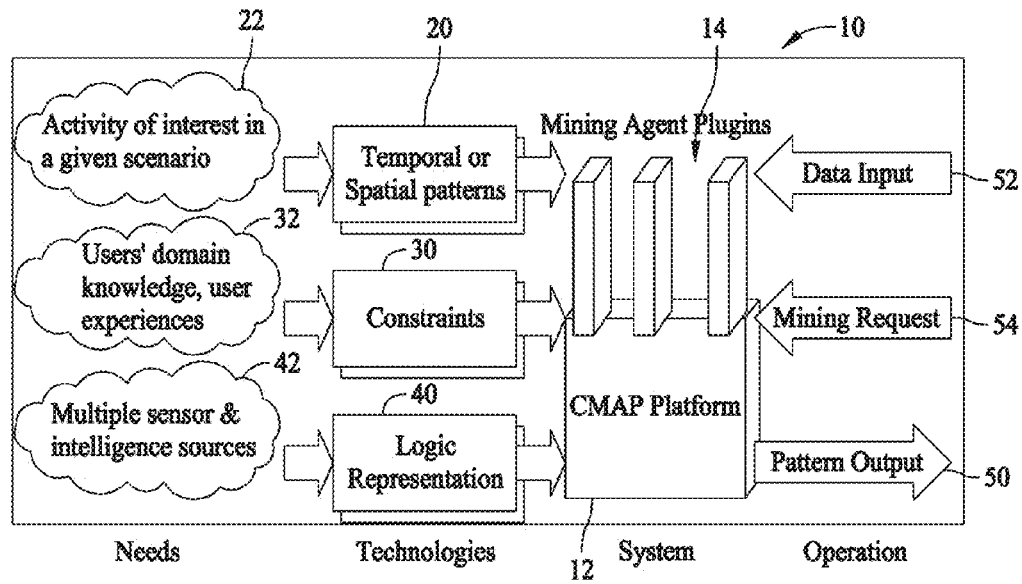
FIG. 1 is a diagram illustrating a constraint-based activity mining (CMAP) roadmap.

The embodiments provided herein describe and specify a software architecture and discovery mechanism for Constraint-based Mining of Activity Patterns (CMAP) framework, operation of which is illustrated by the functional diagram 10 of FIG. 1. The CMAP framework is a uniform framework which is utilized to discover patterns in the same generic form as supported by WARMR. However, the CMAP framework supports a large range of constraints and exploits them to improve data mining efficiency. The CMAP framework is also open and extensible so that new optimization algorithms can be plugged into the framework.

The CMAP framework incorporates semi-automated, multi-source data mining techniques within a CMAP platform 12 to uncover trends in activity, links among objects, and hidden models of behavior/activity to identify relationships and support intent analysis and COA (course of action) alternatives. The framework includes data mining tools, or plug in modules 14, that support searching vast amounts of data for either temporal or spatial patterns 20 for activities of interest 22 in a given scenario, including developing intelligent agents for data mining. The CMAP framework also supports human-in-the-loop analysis so that users can use appropriate constraints 30, based on knowledge and experiences 32 to select the right data sources and discover useful information for their needs. Additionally, a logical representation 40 of multiple sensor and intelligence sources 42 is utilized in the data mining.

As described herein, the CMAP framework also includes data mining agents that support the searching of vast amounts of data for either temporal or spatial patterns 20 for an activity of interest 22. In one embodiment, the data mining agents are plug in modules 14 for the software platform 12. More importantly, the data mining agents (modules 14) enable extensive use of generic constraints 30 to capture rich domain semantics, and are exploited to improve mining efficiency.

In order to capture data from multiple sources 42, data is represented as facts from different first order predicates in logic representations 40. In the illustrated embodiment, constraints 30 are used to capture, for example, users' domain knowledge and user experiences 32 to support human-in-the-loop analysis. Temporal and/or spatial patterns 20 for activities of interest 22 are represented as first order logic clauses. Using these technologies, the CMAP system discovers patterns 50 from multi-source data 52 according to various mining requests 54 supported by the mining agent plug in modules 14.

Figure 2:
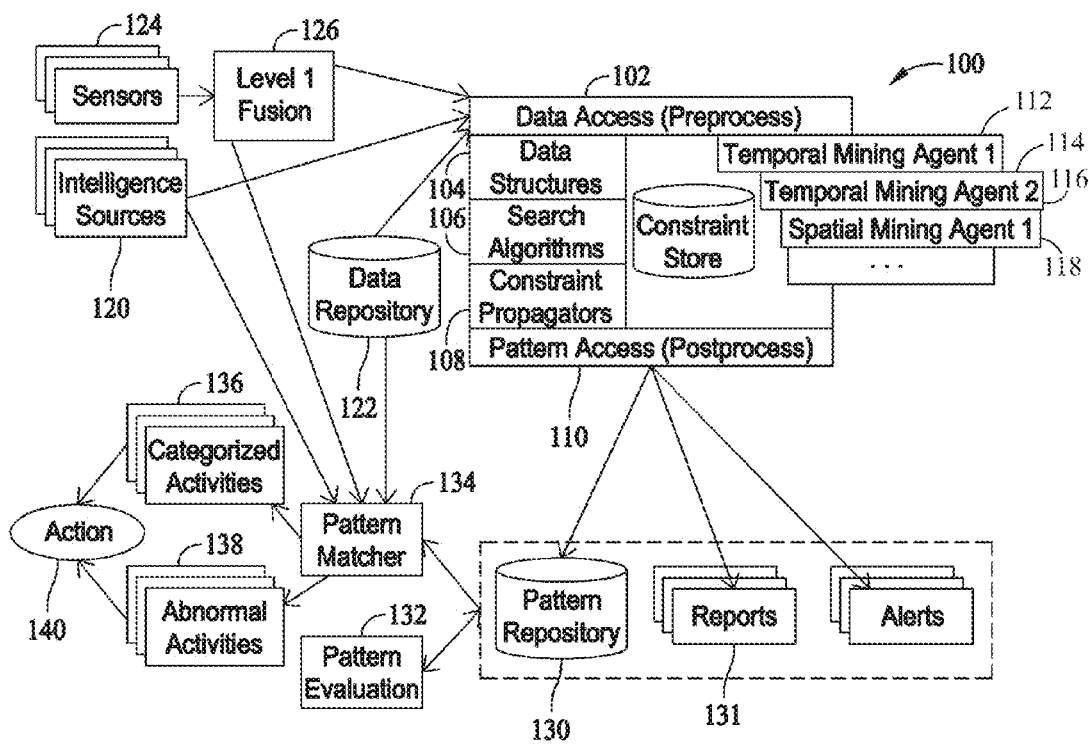
FIG. 2 illustrates operational concepts of a CMAP framework.

FIG. 2 illustrates the concept of operation of the CMAP framework 100 in a specific operation. As described above, the CMAP system 12 includes a data mining platform and mining agent plug in modules 14 to support data mining operations. Blocks 102-110 are the central components of the data mining platform, and include a data access module 102, data structures 104, search algorithms 106, constraint propagators 108, and a pattern access structure 110. Blocks 112-118 are the data mining agent plug in modules for providing temporal and/or spatial mining capabilities. In the example of FIG. 2, a first temporal mining agent 112, a second temporal mining agent 114, a first spatial mining agent 116, and a block 118 representing any additional temporal or spatial mining agents are shown. The other blocks are external to the CMAP system 100, and are shown for reference.

Specific to FIG. 2, data from intelligence sources 120, repositories 122, and sensors 124 (via sensor fusion engines 126) are fed into the CMAP framework 100 where users are able to specify their interests and constraints as described above. The CMAP framework then selects corresponding mining agents that combine the generic search algorithms 106 with appropriate constraint propagators 108 to discover activity patterns meeting the specified interests and constraints. The discovered patterns are saved into repositories 130 and/or reported 131 to the users. These patterns can be evaluated 132 and matched 134 against the new data to categorize 136 new activities or to detect 138 abnormal activities. Finally, users are able to take appropriate actions 140 using the activity categorization 136 or detected 138 abnormality. It should be noted that the CMAP framework 100 is only responsible for pattern mining.

Figure 3:
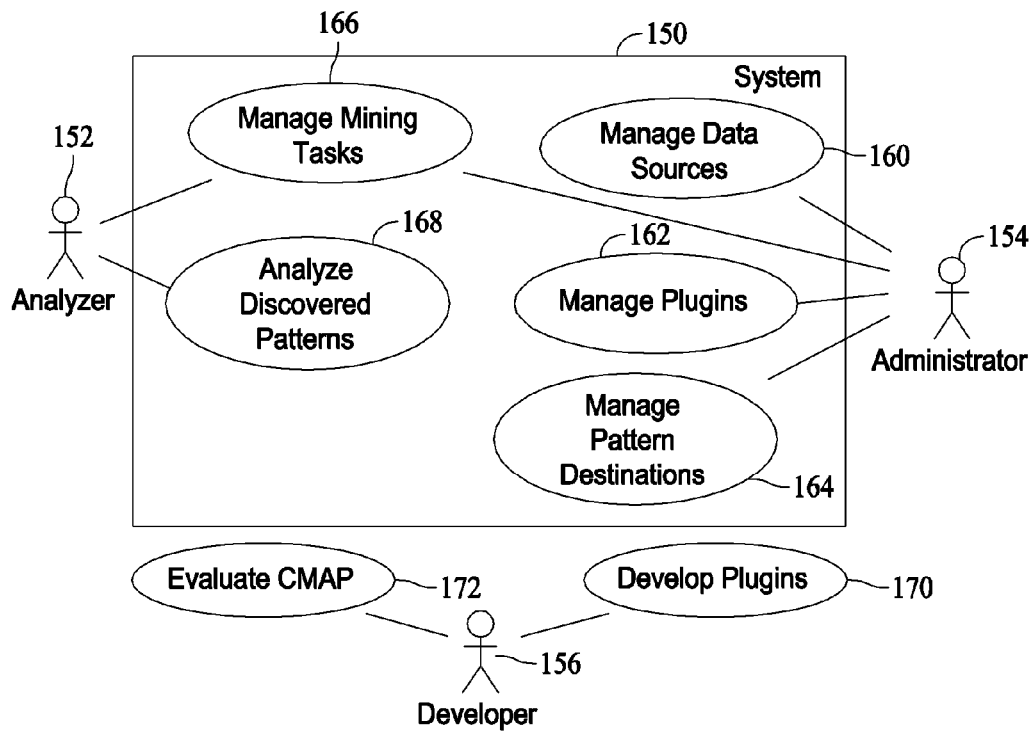
FIG. 3 identifies interaction scenarios between a CMAP software system and various user types.

The following figure descriptions are provided to describe major use cases to support the operation of the CMAP framework. Referring to FIG. 3, the use cases identify key interaction scenarios between the CMAP software system 150 and various types of human users, specifically, the analyzer 152 who is interested in discovering patterns, the system administrator 154 who has the knowledge of managing the CMAP software including data sources, pattern destinations and plug in modules, and the software developer 156. In practice, the same user may be capable of assuming multiple roles, for example, both an analyzer and an administrator.

FIG. 3 also illustrates seven top-level use cases for the various types of human users. Five of the use cases, manage data sources 160, manage plugin modules 162, manage pattern destinations 164, manage mining tasks 166, and analyze discovered patterns 168, are within the boundary of a deployed system while the others, develop plugin modules 170 and evaluate CMAP 172 are development scenarios. The following paragraphs describe each of these use case scenarios in detail.

Figure 4:
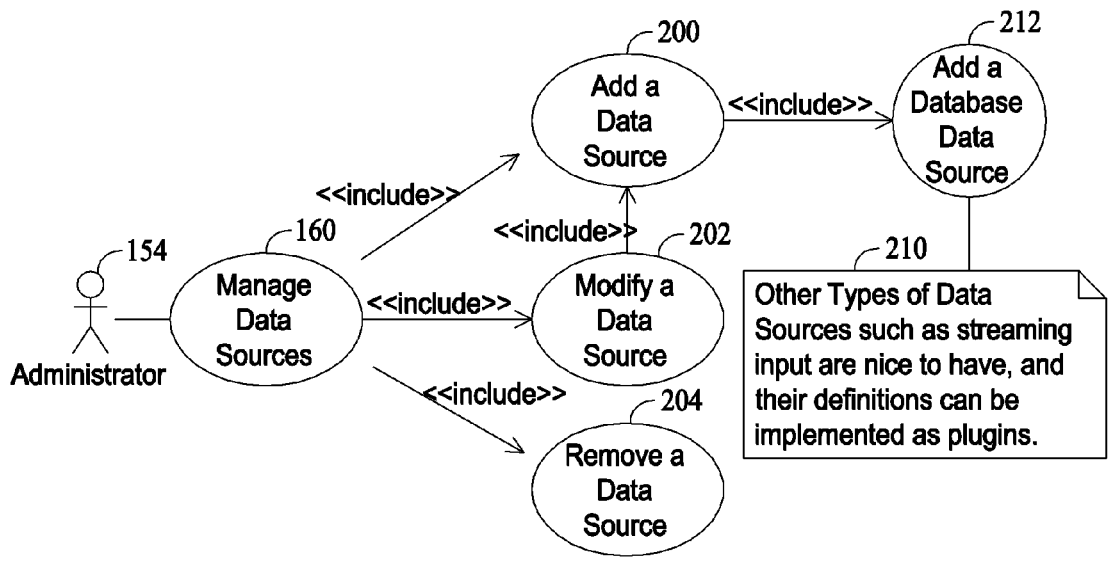
FIG. 4 illustrates decomposition of a manage data sources use case.

With regard to managing data sources, an administrator 154 knows the potential sources of data for discovering activity patterns, and hence can add 200 a data source to the system so that analyzers 152 can create a mining task using these data sources. Additional data source management use cases include modification 202 and removal 204 of the data source definitions. FIG. 4 illustrates the decomposition of the manage data sources 160 use case. Data can come from different types of sources, such as a database or a streaming event publisher 210. FIG. 4 also includes a use case for creating 212 a data source using a database.

Figure 5:
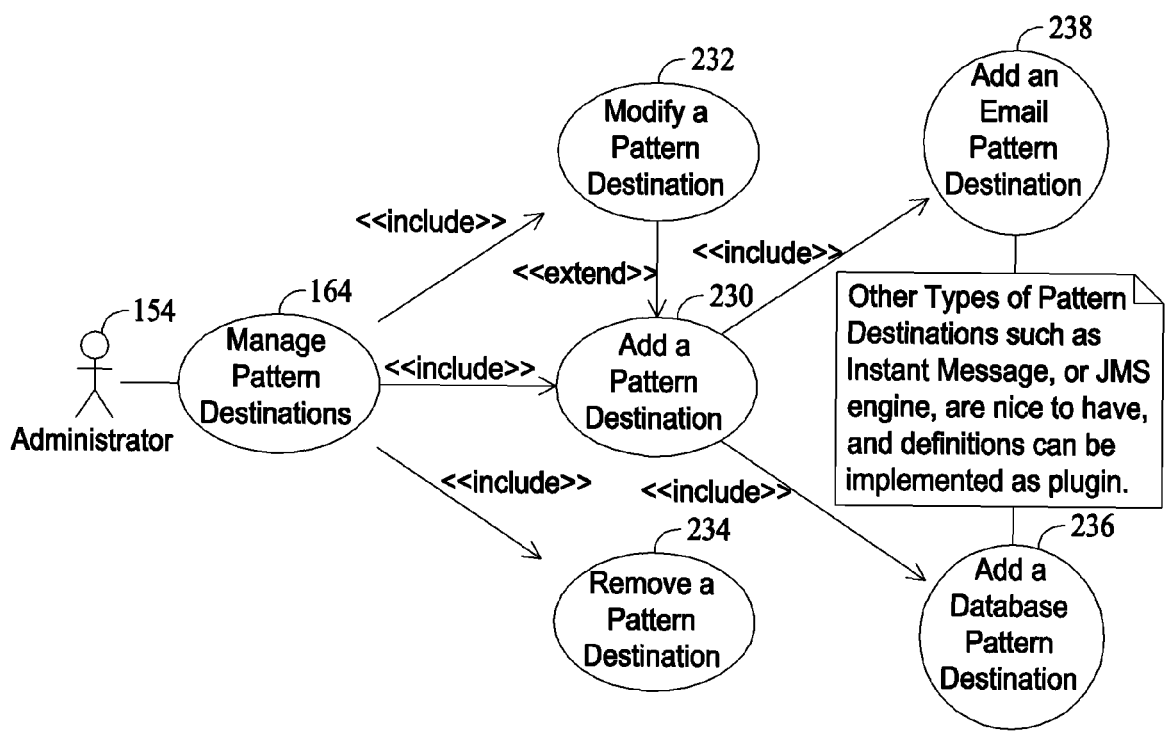
FIG. 5 illustrates decomposition of a manage pattern destinations use case.

It is often useful to save the discovered patterns for later analysis, or to notify interested partners of the discovered patterns. To that end, FIG. 5 illustrates the decomposition of the manage pattern destinations 164 use case. Where the discovered patterns are sent is referred to as pattern destinations in CMAP. Often an administrator 154 knows the potential destinations, and hence can add 230 a pattern destination to the system so that analyzers can create a mining task using these pattern destinations. Additional pattern destination management use cases include modification 232 and removal 234 of the pattern destination definitions. FIG. 5 also illustrates the decomposition of the manage pattern destinations use case, including the use cases for adding two concrete types of pattern destination, one for adding 236 database patterns into a database, and another for adding 238 electronic pattern destinations to an electronic mail account.

Figure 6:
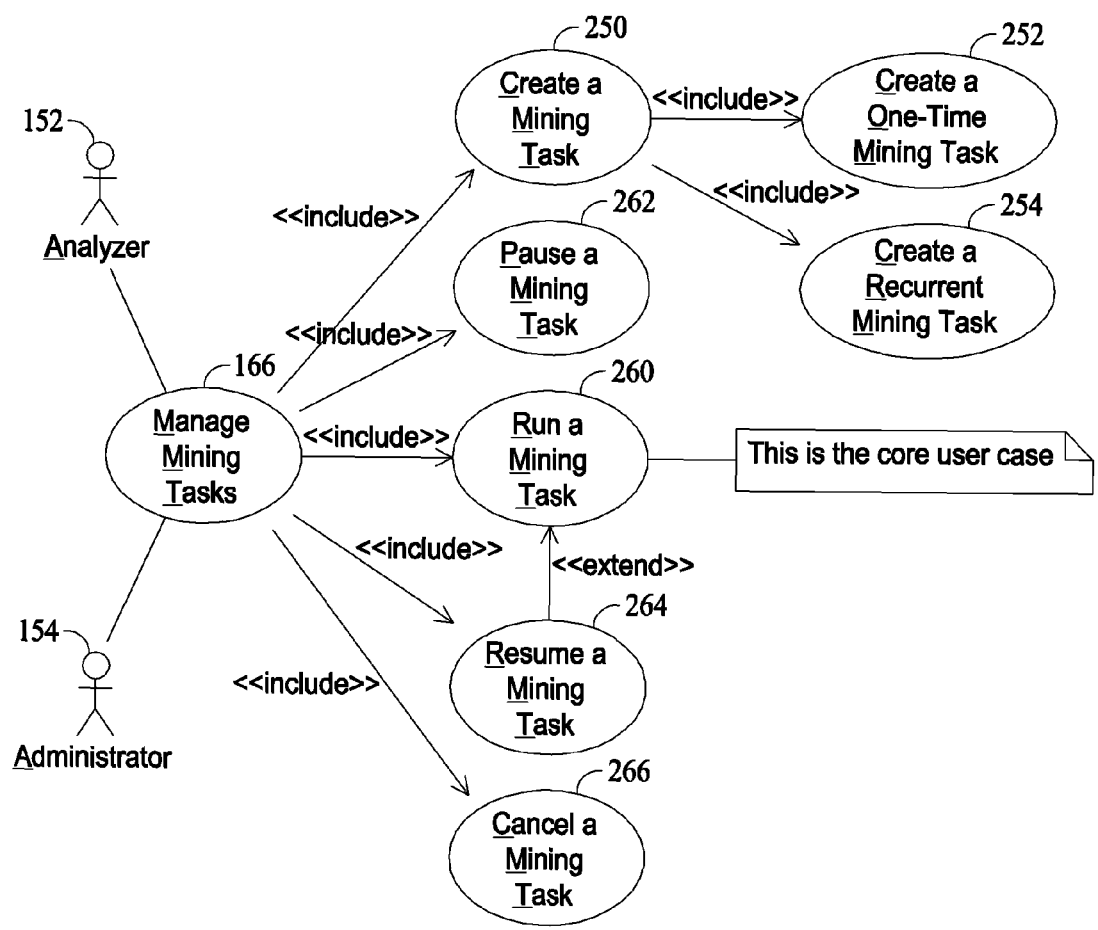
FIG. 6 illustrates decomposition of a manage mining tasks use case.

The most important use case scenario for certain users is the ability to create and manage pattern mining tasks. FIG. 6 illustrates the manage mining tasks 166 use case and its decomposition. With respect to creating 250 a mining task, an analyzer 152 often first creates 252 a one-time mining task and/or creates 254 a recurrent mining task. Once a task is created 250, either an analyzer 152 or an administrator 154 can start (run) 260 the task, pause 262 the task, resume 264 the task and/or cancel 266 the task before it is finished. The creation use case can be further decomposed depending on the different types of mining tasks.

Figure 7:
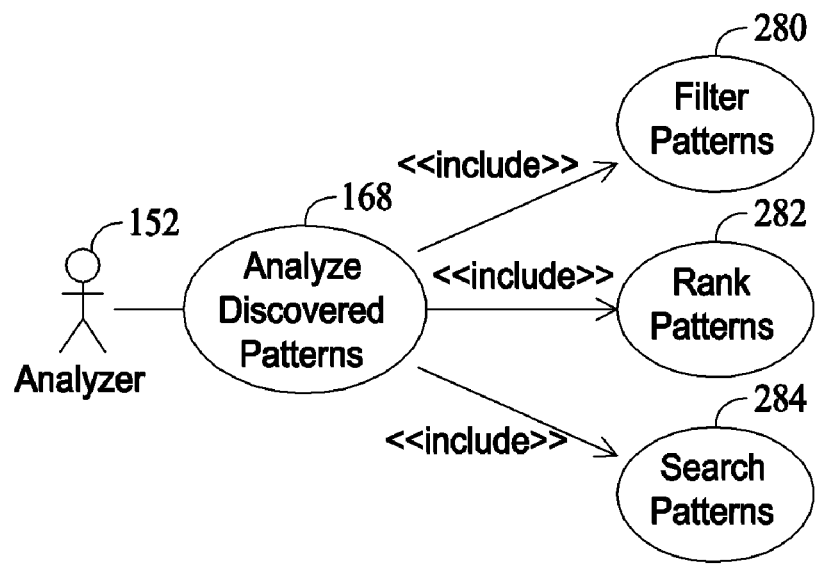
FIG. 7 illustrates an analyze discovered patterns use case.

With regard to an analyze discovered patterns 168 use case, illustrated in FIG. 7, running a task will generate patterns satisfying the specified requirements in the task. Analyzers 152 often want to analyze the available patterns. The set of patterns to be analyzed can be the result of a single task run, or from previous discoveries that are cached in memory or saved in repository, or the partial result of the current running task. Pattern mining tools often generate a large number of patterns as the result of a task run. CMAP supports different types of pattern analysis, including filtering 280 a given set of patterns, ranking 282 patterns from a list and according to specified attributes, and searching 284 patterns in the pattern set with certain criteria.

Figure 8:
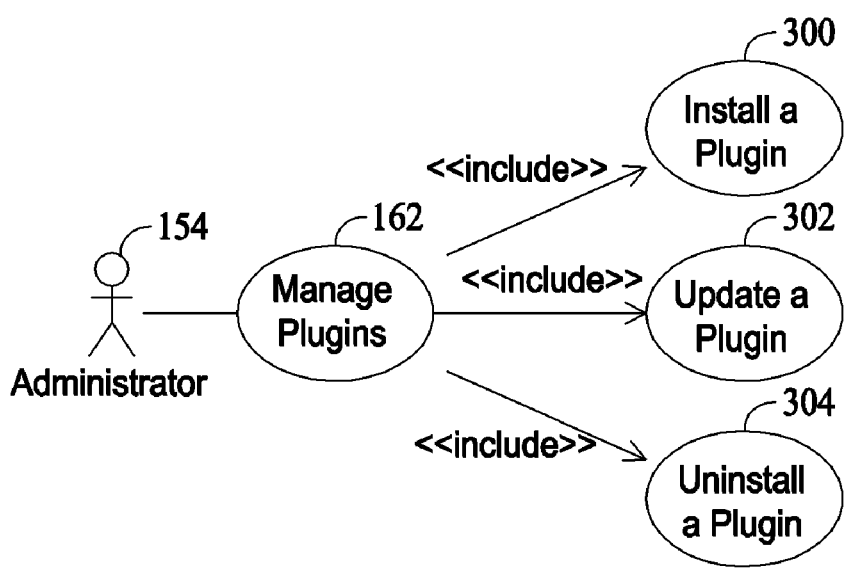
FIG. 8 illustrates a manage plug in modules use case.

As shown in FIG. 8 and with regard to the manage plug in modules use case 162, the CMAP framework is extensible so that administrators 154 can install 300 new plug in modules into the CMAP platform, update 302 these plug in modules when new versions are ready, and remove 304 a plug in module if its functionality is no longer necessary, for example, to reduce resource usage and hence improve performance.

Figure 9:
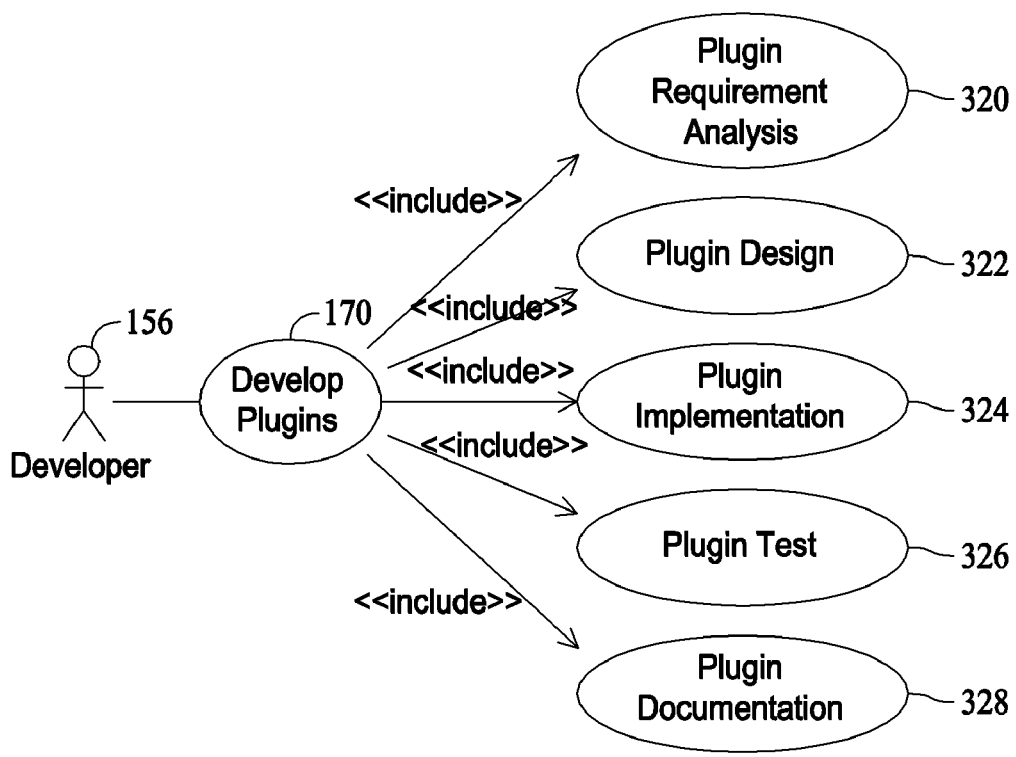
FIG. 9 illustrates development of a CMAP plug in module.

To develop 170 a CMAP plug in module, as illustrated by FIG. 9, a developer 156 performs a plug in module requirements analysis 320, a plug in module design 322 and implementation 324, as well as a debug and test 326 for the plug in module. Documentation 328 for the plug in module should also be prepared, as illustrated in FIG. 9.

The architectural impact of the development of a develop plug in module use case on CMAP software is to provide clean interfaces and guidelines for developers to develop compatible plug in modules. To provide the clean interfaces, use case development includes identifying the extension points ("outlets for the plug in modules") such that new plug in modules can be added, specifying the requirements of the plug in modules (through interface definitions in the programming language, and schema definition for the plug in module configuration files), as well as inspecting and using the plug in modules at runtime (through the code development).

Figure 10:
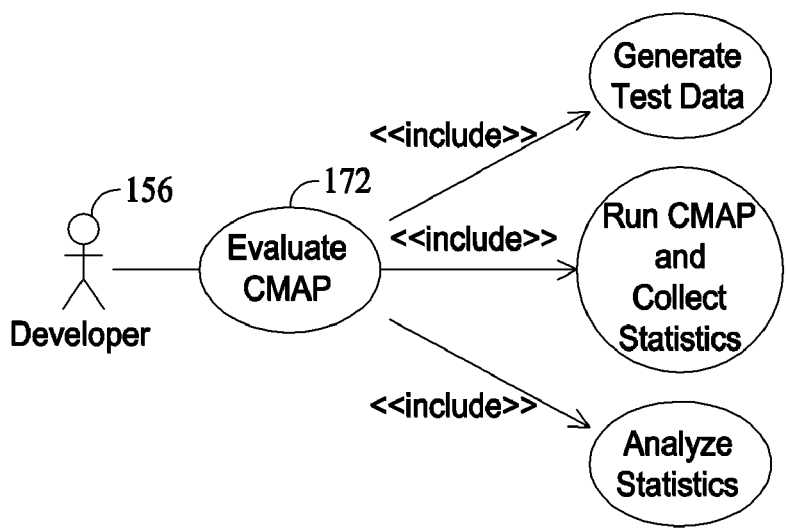
FIG. 10 illustrates an evaluate CMAP use case.

With regard to an evaluate CMAP 172 use case, as illustrated in FIG. 10, developers 156 (or evaluators) may evaluate the performance of different mining tasks using CMAP, including generating 340 test data, running 342 CMAP against the test data to collect statistics, and analyzing 344 the statistics collected during test runs. The evaluate CMAP 172 use case utilizes CMAP to collect statistics whenever instructed for various internal steps and to log configurations and task settings to provide context information for the collected statistics.

Figure 11:
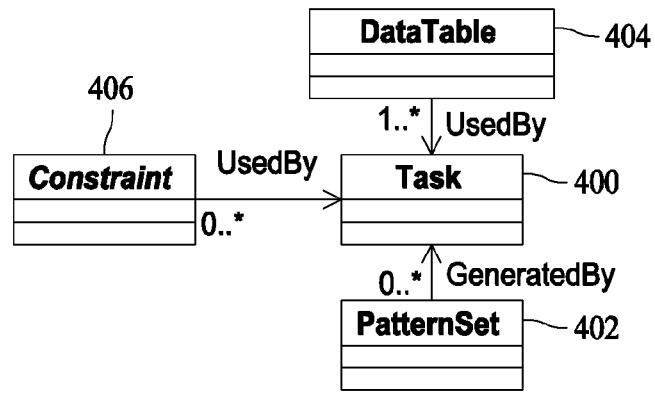
FIG. 11 illustrates classes in a CMAP framework utilized in pattern discovery.

FIG. 11 illustrates key classes in the CMAP framework to achieve the pattern discovery goal. These classes are essential in carrying out the key functionality of CMAP, that is, to discover patterns from data according to user requirements. Essentially, at each run, a task 400 discovers a set of patterns 402 from a (non-empty) set of data tables 404, optionally using a set of constraints 406. Note that in one embodiment data are represented as DataTable inside CMAP, whether they come from a database or from other types of data sources. Each of these classes depends on other related classes and is managed by some other managing objects (not shown in FIG. 11). We discuss these key classes and their related classes in detail in the rest of this section.

Figure 12:
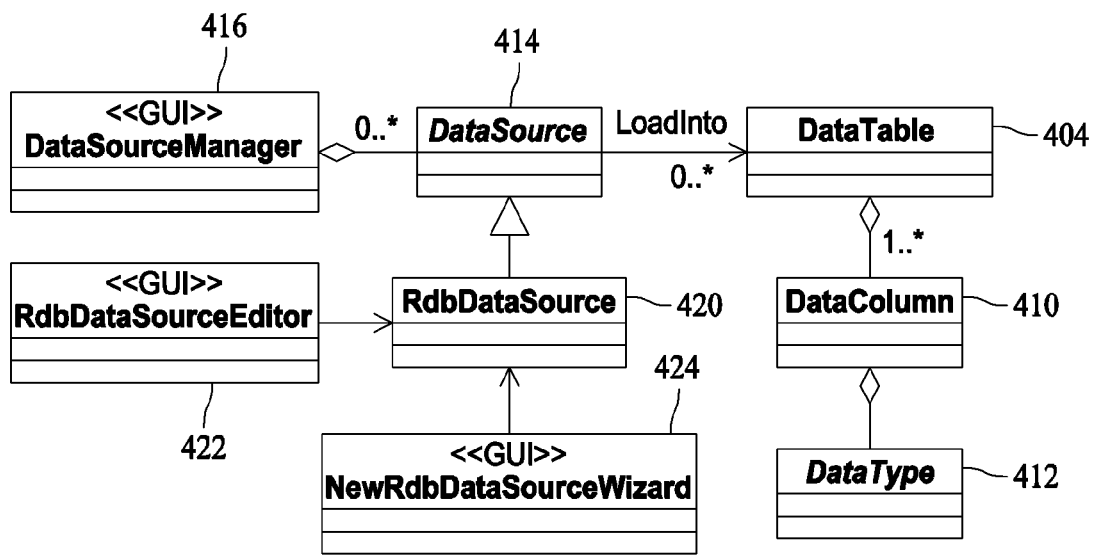
FIG. 12 illustrates classes in a CMAP framework related to a DataTable class within a CMAP framework.

FIG. 12 illustrates the classes related to the key DataTable 404 class. In an embodiment of CMAP, a data table 404 includes multiple data columns 410. Each data column 410 has a single data type. In addition, a data table 404 has multiple rows 412 of actual data records. Each row has multiple values, one for each data column. Data records are represented in an array member of the DataTable class.

A data source 414 (DataSource) may provide data for multiple data tables 404. Data sources 414 are managed and the manager 416 (DataSourceManager) provides a GUI. In one embodiment, the DataSource class is abstract. Concrete data source classes can be added as plug in modules. An embodiment of the CMAP framework provides a basic plug in module, RdbDataSource 420, to handle relational database data sources supporting the JDBC interface. In addition, embodiments of a data source plug in module also provide an editor GUI (e.g., RdbDataSourceEditor 422) and a creation wizard GUI (e.g., NewRdbDataSourceWizard 424).

Figure 13:
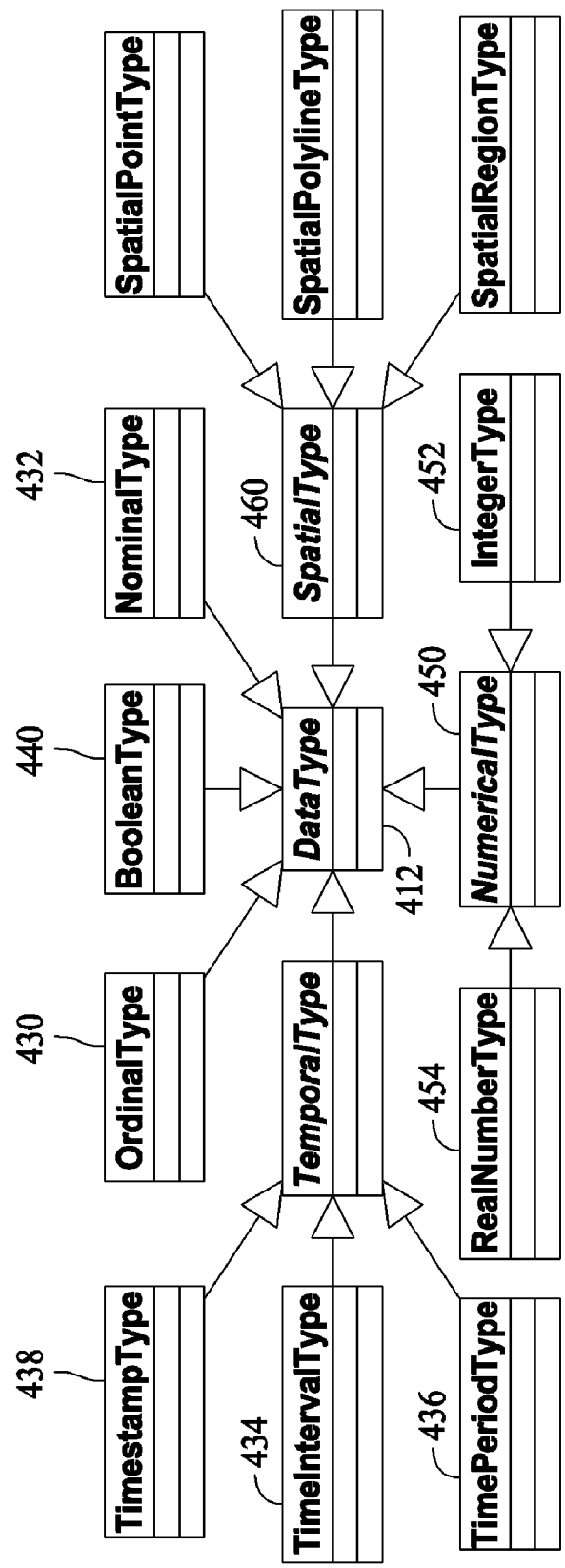
FIG. 13 illustrates various data types supported in one embodiment of a CMAP framework.

FIG. 13 illustrates the various data types 412 supported in one embodiment of CMAP. An OrdinalType 430 and a NominalType 432 are similar. Both support a finite set of string constants in their domains. However, the constants are ordered for OrdinalType 430, but not for NominalType 432. TimeIntervalType 434 refers to a relative period, such as a day or two weeks. TimePeriodType 436 refers to an absolute period such as the first week in Year 2000 or the $19^{th}$ century.

Note that data types are represented as objects instead of classes in CMAP software. For example, there can be different OrdinalType 430 objects, each with a different set of value enumerations. For another example, there can be different TimestampType 438 objects, each with a different time unit. TimeIntervalType 434, TimePeriodType 436, and TimestampType 438 are various examples of TemporalTypes 439. Some classes, such as BooleanType 440 in FIG. 13, only have a single instance. A NumericalType 450, for example, may include both an IntegerType 452 and a RealNumberType 454. Various SpatialTypes 460 may also be included as a DataType.

Additional data types can be added to CMAP as plug in modules. All data types subclass the abstract DataType 412 class, which mandates two methods for obtaining the parent data types and the child data types. In an embodiment, CMAP allows multi-inheritance on data types. In other words, a single data type may have multiple parent data types. For example, PositiveInteger can have both PositiveNumber and Integer as its parent data types. Hence, the parent-child relationship constitutes a partial order on the CMAP data type system. This partial order is important in generating patterns in which the same variable cannot be used in a set of columns (predicate arguments) unless all the data types of these columns have the same ancestor data type (otherwise, it is impossible to assign a valid value for the variable while conforming to the data type requirements in all the columns). In addition, each concrete data type class should also provide a method to convert a value from the internal representation to a string to facilitate the display of the data content and the pattern using that data type.

Figure 14:
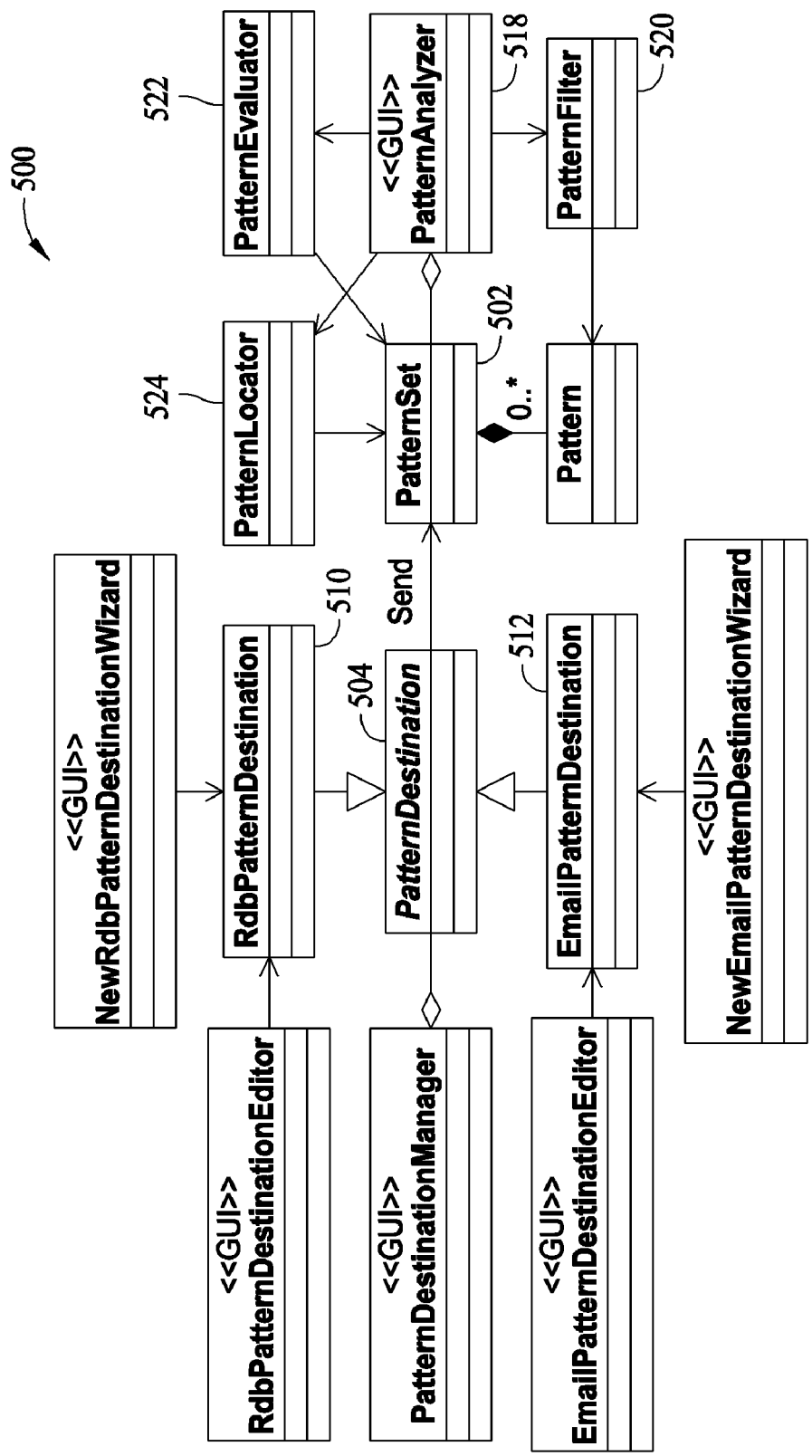
FIG. 14 illustrates additional classes related to a PatternSet class within a CMAP framework.

FIG. 14 illustrates additional classes 500 related to the key PatternSet 502 class. Patterns are saved into pattern destinations 504 (PatternDestination) which are managed through a GUI. In an embodiment, CMAP provides two different types of pattern destinations, RdbPatternDestination 510 to save patterns into relational database supporting the JDBC interface, and EmailPatternDestination 512 to send patterns via the SMTP protocol. Other types of destinations can be added as plug in modules. For each type of destination, an editor and a creation wizard should be provided.

Three classes are used to support the pattern analysis GUI 518: PatternFilter 520 filters patterns by checking an individual pattern; PatternEvaluator 522 calculates metrics for an individual pattern optionally in the context of one or more sets of patterns; and PatternLocator 524 searches patterns from a given set according to a given criteria.

Figure 15:
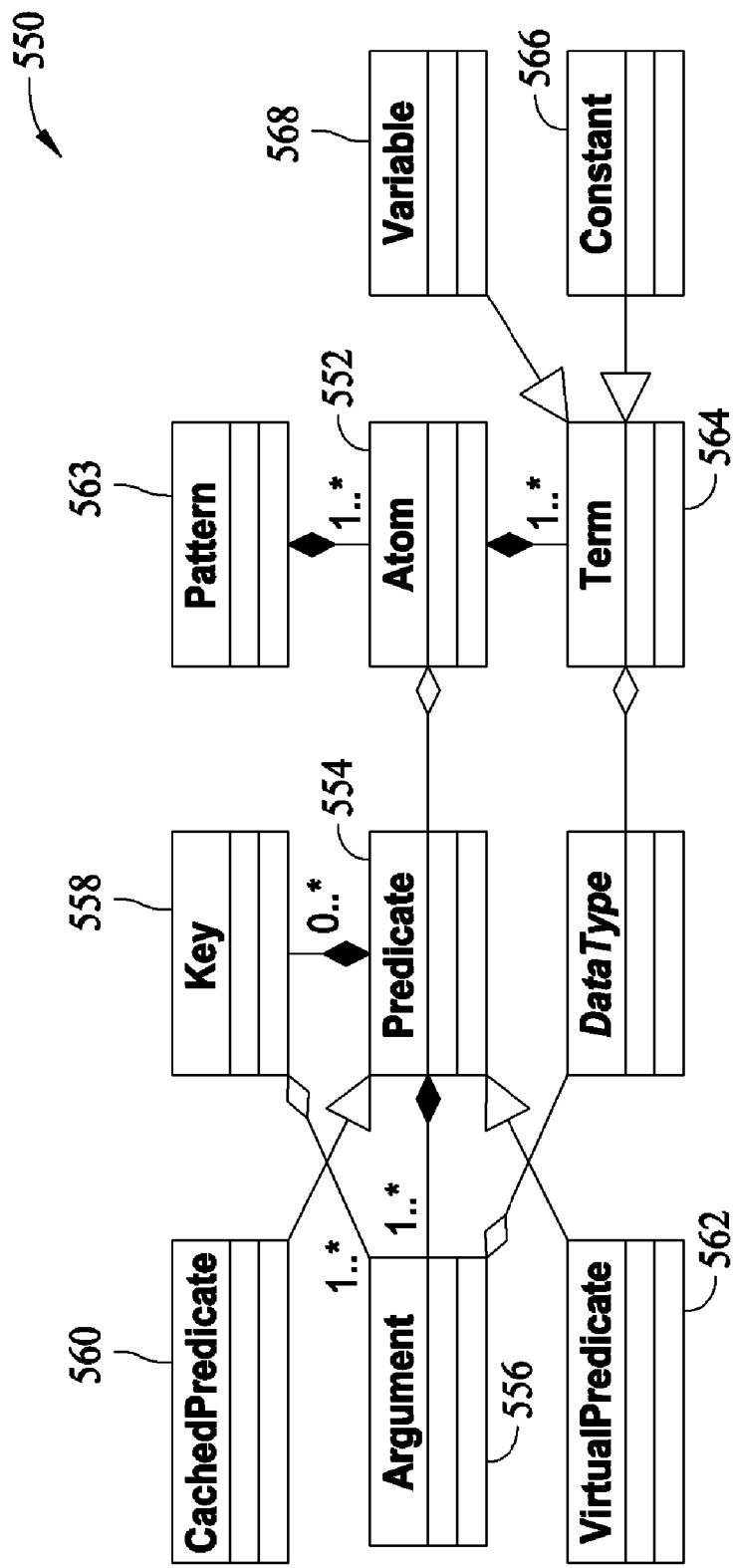
FIG. 15 illustrates the composition of an individual pattern within a CMAP framework.

FIG. 15 illustrates the composition of an individual pattern 550. In the illustrated embodiment, a pattern 550 includes one or more atoms 552 and each atom 552 is defined on a predicate 554. A predicate 554 includes one or more formal typed arguments 556, and optionally a set of keys 558. A key 558 of a predicate 554 consists of a subset of its arguments. Its semantics are the same as the "candidate key" in relational database, that is, for any fact of the predicate 554, the values in the key arguments uniquely determine the values in other arguments.

An important method associated with predicates 554 is a determination of whether a value assignment for all arguments 556 holds for a predicate or not. This determination can be done by either caching all valid value assignments (CachePredicate 560) or evaluating the assignment through on-the-fly computation (VirtualPredicate 562). For example, inSameDay($T_1,T_2$) returns true if and only if the two timestamps are within the same day. The exact virtual predicates and other representations of predicates may be added to CMAP as plug in modules.

An atom 552 in a pattern 563 also includes a list of typed terms 564 corresponding to the formal arguments of its defining predicate 554. These terms are called "real arguments" in programming languages. A term 564 can be either a constant 566 or a variable 568. Different atoms 552 in the same pattern may share the same variable 568. The first atom 552 in a pattern is called the base atom.

As referred to herein, a pattern 563 is denoted by the ordered list of its atoms 552 separated by comma, except the first atom (the base atom) is followed by an arrow instead of a comma. For example, "person(P)→fly(P,$A_1,T_1,A_2,T_2$), fly (P,$A_2,T_3,A_1,T_4$), $A_1$<>$A_2$" is a pattern saying a person takes a round trip flight. Here, the predicate fly has five arguments: the person, the departure airport and time, as well as the arrival airport and time. The capital letters represents variables. For another example, pattern "airplane(P)→squawk(P, 'ModelIII', $T_1, T_2$), communicate(P, 'Tower1',$T_3, T_4$), communicate (P, 'Tower2',$T_5, T_6$), close($T_1,T_3$), close($T_4,T_5$), close($T_2,T_6$)" describes a commercial airplane flying between two airports whose control towers have overlapping coverage.

Figure 16:
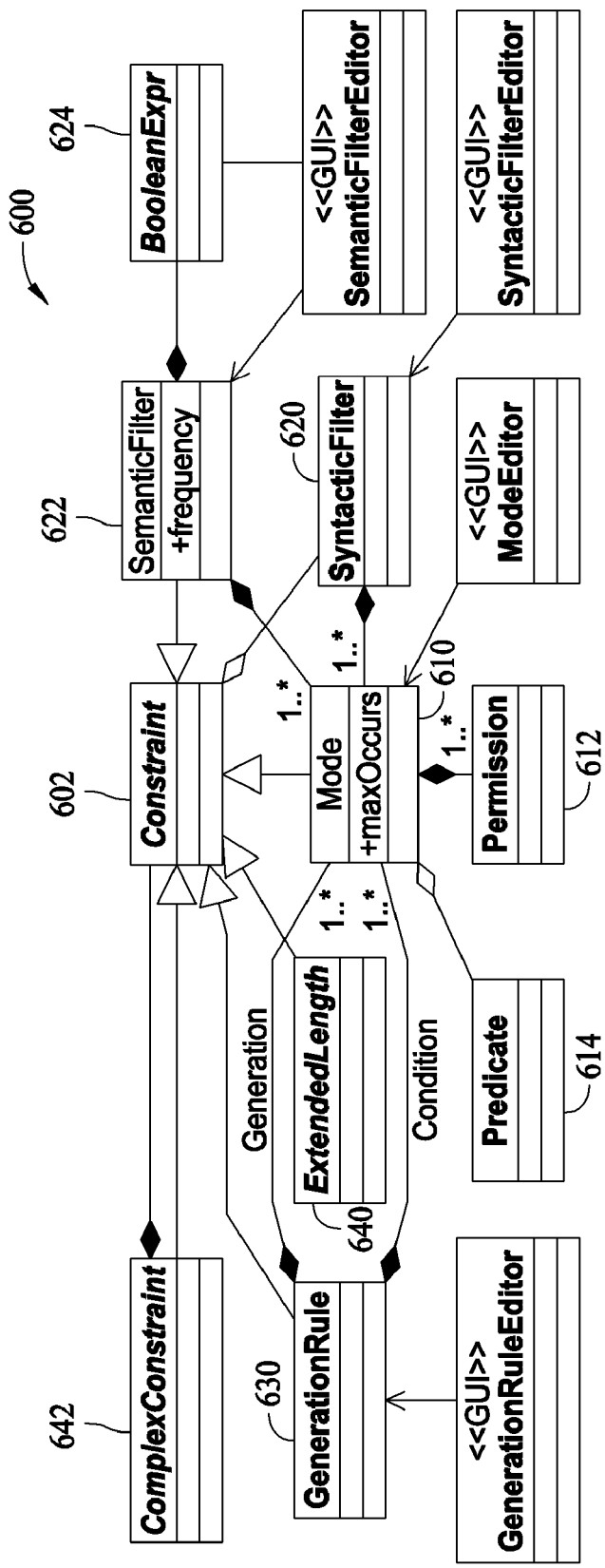
FIG. 16 illustrates classes related to a Constraint class within a CMAP framework.

FIG. 16 illustrates classes 600 related to the Constraint 602 key class. CMAP supports a rich set of constraints 602, and exploits these constraints 602 during the mining process to improve the performance. Not all constraints 602 are represented as classes. For example, all patterns discovered by CMAP are concise, consistent and connected. A pattern is concise if it does not include any redundant atoms. A pattern is consistent if all atom argument values are of their corresponding required data type. A pattern is connected if the first atom is connected to all other atoms where two atoms are connected if they share the same variables in their arguments or they are both connected to a third atom. These constraints are implicit and not explicitly represented. In addition, each mining task discovers patterns based on a specified target predicate on which the base atom of all patterns is defined. The target predicate is specified in the task, and no special class is used to represent this constraint.

The CMAP software supports different types of constraints. A mode (Mode) constraint 610 specifies the permissions 612 on each argument for a given predicate 614, and the maximum number of atoms matching the permission combination allowed in a pattern. The permission of an argument decides whether a constant or a variable is allowed. If a variable is allowed, the permission also decides whether it can occur in atoms before the current one in the same pattern, and whether it can occur in arguments before the current one in the same atom. The permission can also be a reference to another argument in the same atom or in another atom matching another mode. In this case, the matching atom utilizes the same term in the referenced argument and the referencing argument. For example, the mode inSameDay(f,f) means both arguments of inSameDay must be "first reference to old variable". In other words, (1) only variables are allowed, (2) the variables are introduced by other atoms before the current one in the pattern, and (3) the two variables are different. The permission of an argument can also restrict the data type in the matching atom to be a sub-type of the data type defined in the predicates. For example, the predicate move($L_1,L_2$) describes movements between two locations, and a mode can require that the first location must be an airport and the second location must be a hotel.

CMAP uses a sequence of modes to filter patterns, for example, SyntacticFilter 620. Consider a sequence containing two modes, inSameDay(f,f),inSameDay(1.2,1.1), where 1.1 (or 1.2) refers to the first (second, respectively) argument in the first mode in the sequence. Using such a constraint, generation of patterns with redundant atoms can be avoided (since inSameDay is a symmetric relationship). Clearly, a SyntacticFilter 620 constraint is independent of the value assignment of the involved predicates specified by the input data.

A SemanticFilter 622 constraint depends on the data, i.e., valid value assignments of the predicates 614. The Semantic-Filter 622 contains a minimum frequency (integer) threshold, a sequence of modes, and a Boolean expression 624 on the arguments in the modes. A pattern trivially satisfies a SemanticFilter 622 constraint if it does not satisfy the mode sequence. Otherwise, in a pattern satisfying the mode sequence, for each distinct valid value assignment to the base atom, the Boolean expression 624 is evaluated using all possible valid value assignment to all other variables in the pattern. If and only if the number of times the Boolean expression 624 is evaluated to be true is greater than the minimum frequency threshold, the pattern satisfies the SemanticFilter 622 constraint. For example, in a mode sequence person(v), fly(1.1,v,v), v means "any variable" (old or new), and a Boolean expression count(2.1)/(max(2.1)−min(2.1)+1)>6, where max and min return the maximum and minimum year of the (flight start) time, and count returns the number of distinct (flight start) time. With a minimum frequency of three, patterns can be found involving at least three people that are frequent flyers.

CMAP also supports another type of data independent constraints using mode sequences, for example, generation rules. A GenerationRule 630 constraint has a sequence of modes called condition modes and a set of additional modes called generation modes. A pattern trivially satisfies a generation rule if it does not match its condition mode sequence. If a pattern does match the condition mode sequence, it must match one of the generation modes. For example, fly(*,*,*, *,*)→fly(1.1,1.4,*,1.2,*), where * means any term (variable or constant) and fly has five arguments (person, departure airport, departure time, arrival airport, arrival time), requires that the flight in all patterns must be round trip.

CMAP supports the maximum length constraint, for example, a pattern can include atoms only up to a given maximum number, since it is often difficult for the user to understand very long patterns. In addition, CMAP provides an abstract ExtendedLength 640 class, which mandates a method that returns an integer, called extended length, for any input pattern. The extended length must be no smaller than (>=) the actual length, i.e., the number of atoms in the pattern. In addition, the extended length of a pattern must be no smaller than the extended length of its sub-patterns (i.e., patterns using a subset of atoms). The ExtendedLength 640 class mandates a related method which also returns an integer, called super extended length, for any input pattern. The super extended length for a pattern must be greater than (>) its extended length, but no greater than the extended length for its super-patterns.

With regard to extended length, its properties are utilized for improving mining efficiency. In one embodiment, extended length 640 may be thought of as a minimum length for patterns satisfying some complex constraints and obtained by appending atoms to the given pattern. For example, having all travels start from home and end at home cannot be easily captured in the types of constraints explained above. However, a new constraint type can be added as a plug in module. However, since this constraint is not anti-monotone and therefore it cannot be utilized to greatly improve the mining efficiency. Instead, an extended length subclass is built, which checks for a pattern to see the start and stop locations and decided how many new atoms should be added. For example, for pattern person(P)→drive(P,$L_1$,$L_2$),home ($L_1$), at least one more atom has to be added to get back to home and hence the extended length is four, for pattern person (P)→drive(P,$L_1$,$L_2$), home($L_1$), the extended length is three since no additional atoms are needed. For pattern person(P) →drive(P,$L_1$,$L_2$), Home($L_1$),fly($L_3$,$L_4$), at least two more movement ($L_2$→$L_3$ and $L_4$→$L_1$) are added and hence the extended length is six. The super extended length of a pattern is checked during the mining process, and if it is greater than the maximum length, it is not possible to generate a valid pattern by adding new atoms to the pattern.

In the above example, the extended length 640 constraint does not fully capture the exact meaning of the original constraint (e.g., start from home and end at home), even though it provides an efficient filtering step. However, a generation rule can be added such that person(*), home(*)→drive(1.1,2.1,*) |fly(1.1,2.1,*)|ride(1.1,2.1,*)|walk(1.1,2.1,*) to ensure that the travel starts from home, and another rule can be similarly added to ensure that the travel ends at home. Eventually however, a customized constraint is needed to check that all stops are connected and constitutes a simple path starting from and ending at home.

CMAP supports a ComplexConstraint 642, which can include a set of constraints, each with different filtering power and computation cost. In one embodiment, the set of constraints is organized using the subsumption relationship among them: a constraint $C_1$ is subsumed by another constraint $C_2$ if a pattern satisfying $C_1$ also satisfies $C_2$. The set includes the "actual constraint", which is subsumed by all other constraints in the set. The mining algorithm is operable to select a subset of constraints during the mining process, and must eventually apply the "actual constraint".

Figure 17:
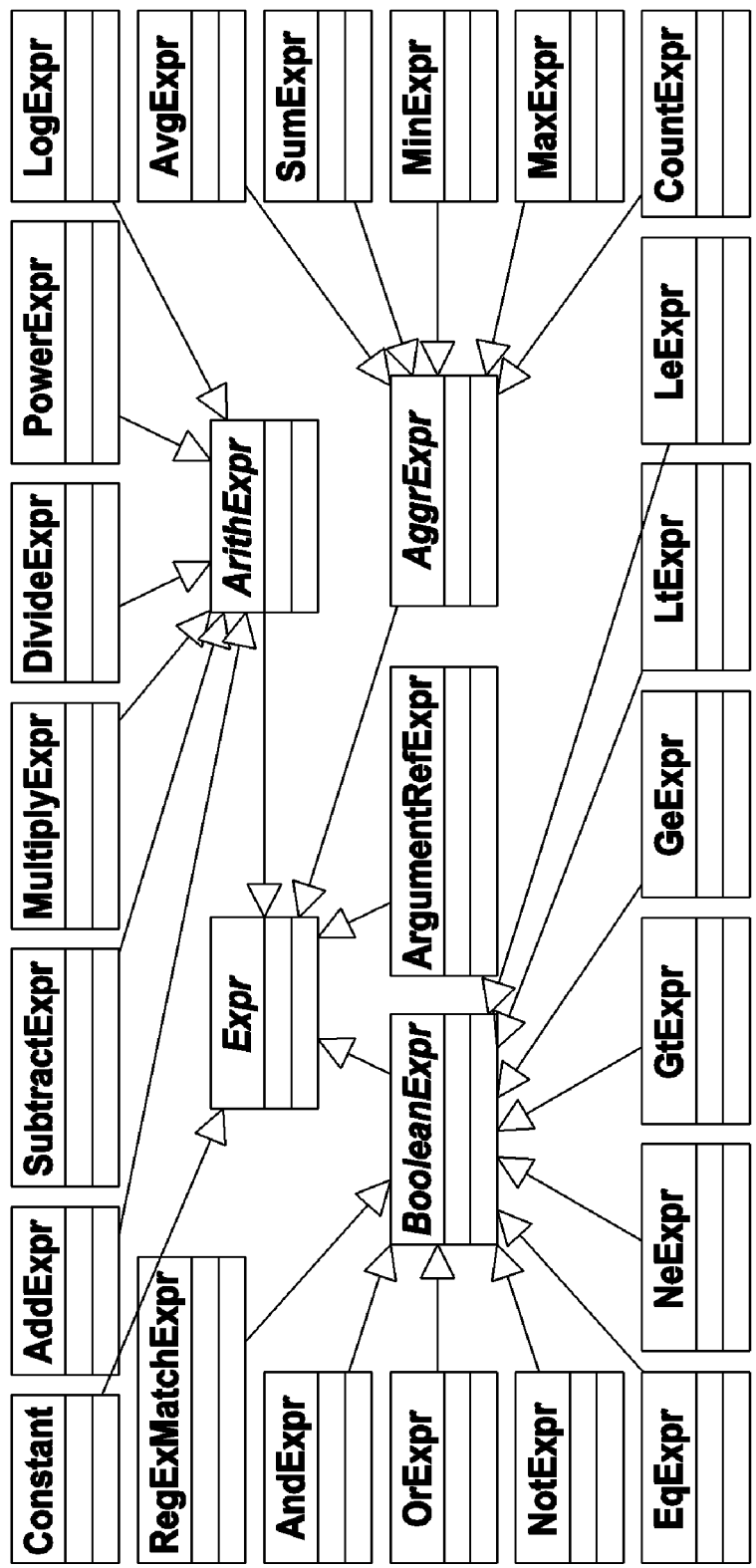
FIG. 17 illustrates classes utilized to represent an expression used in a SemanticFilter constraint within a CMAP framework.

FIG. 17 illustrates the classes used to represent the expression used in the SemanticFilter 622 (shown in FIG. 16), in one embodiment. Additional classes can be added as plug in modules to support the expression allowed in the SemanticFilter 622 constraint.

Figure 18:
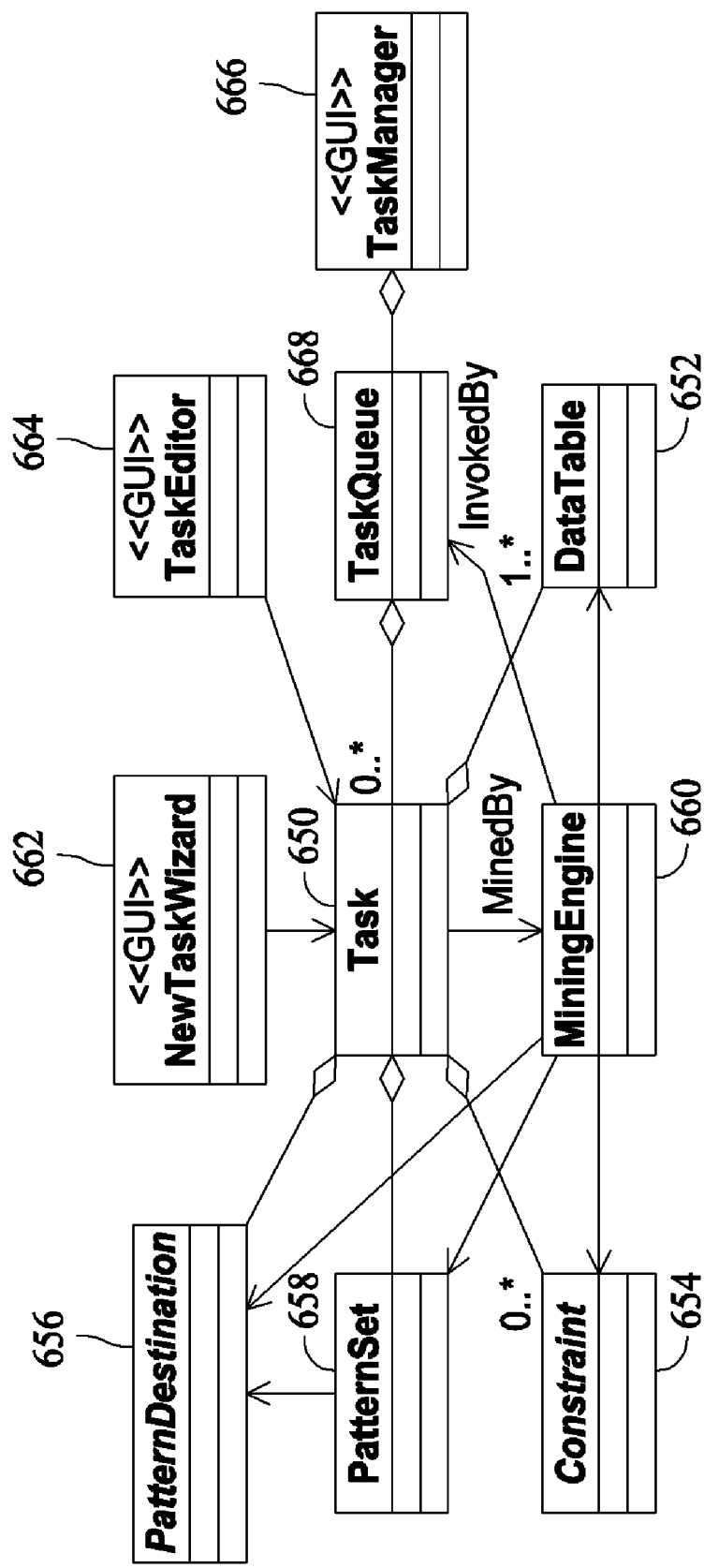
FIG. 18 illustrates classes related to a Task key class within a CMAP framework.

FIG. 18 illustrates classes related to the Task key class. A task 650 needs to specify the input data tables 652, optionally a set of constraints 654, and the destination 656 to send the discovered patterns. The patterns discovered are also cached locally, for example in PatternSet 658 for the task for analysis purpose. Tasks 650 are queued in a FIFO fashion, in one embodiment. The MiningEngine is invoked to run each task 650. To run the task 650, it takes data from data tables 652, uses the constraints 654, generates the patterns into the specified pattern set 658, and sends patterns to the destination 656, if specified. GUI classes are provided for task creation 662, task modification 664, and task management 666 of the queue 668 of tasks 650.

Figure 19:
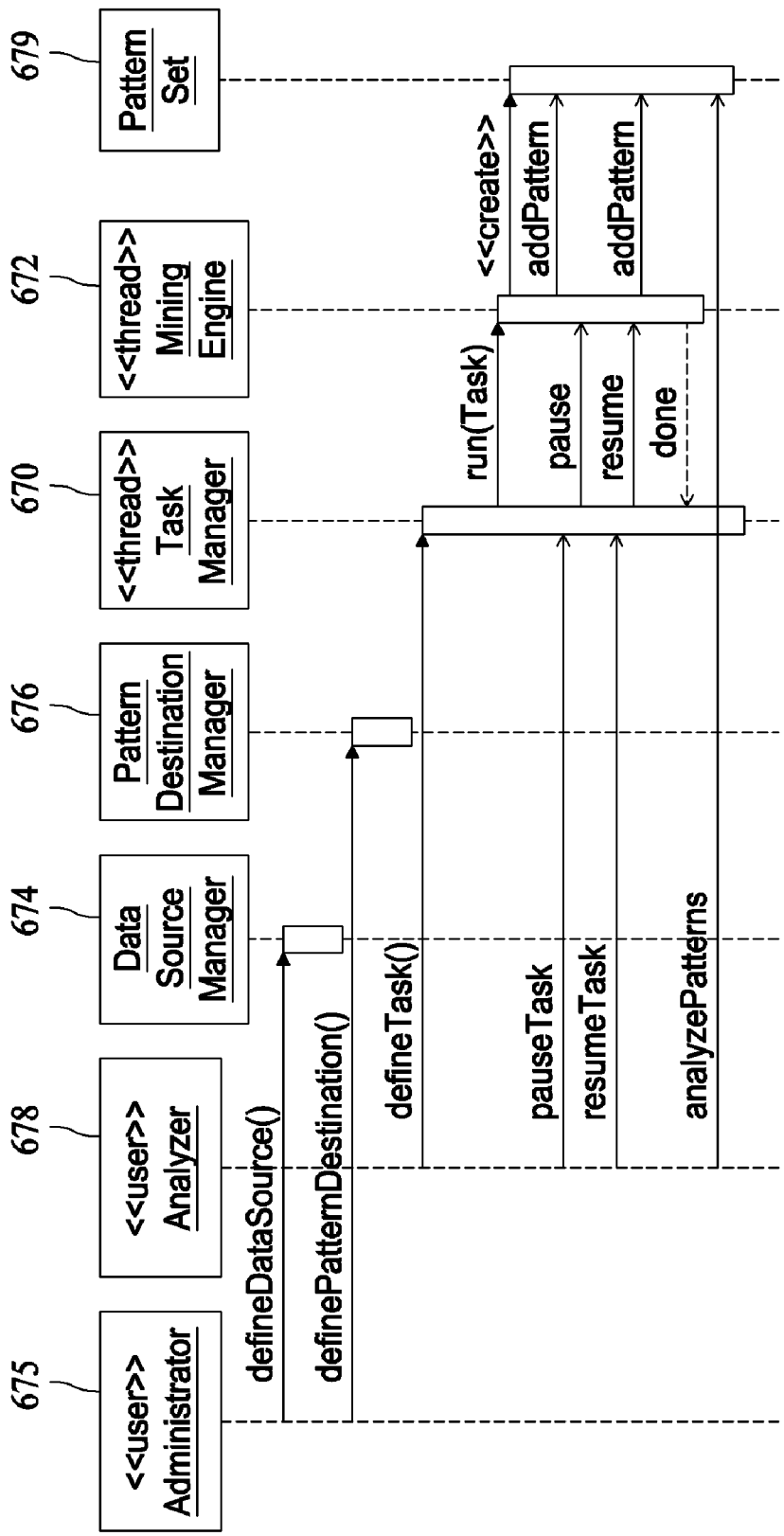
FIG. 19 illustrates steps for using a CMAP framework to discover and analyze activity patterns.

FIG. 19 illustrates the steps for using a CMAP framework to discover and analyze activity patterns. For example, and in one embodiment, TaskManager 670 and MiningEngine 672 are two execution threads in the CMAP system. After the data sources are defined in a data source manger 674 by an administrator 675 and pattern destinations are defined in a pattern destination manager 676 by an administrator 675, an analyzer 678 can define a task using these execution threads. The task manager thread schedules the mining engine thread to execute each task, and during the execution, the analyzer 678 can request the mining engine to pause and to resume later. During the task execution, the mining engine generates pattern sets 679, which can be analyzed by the analyzer 678 (using a GUI).

Figure 20:
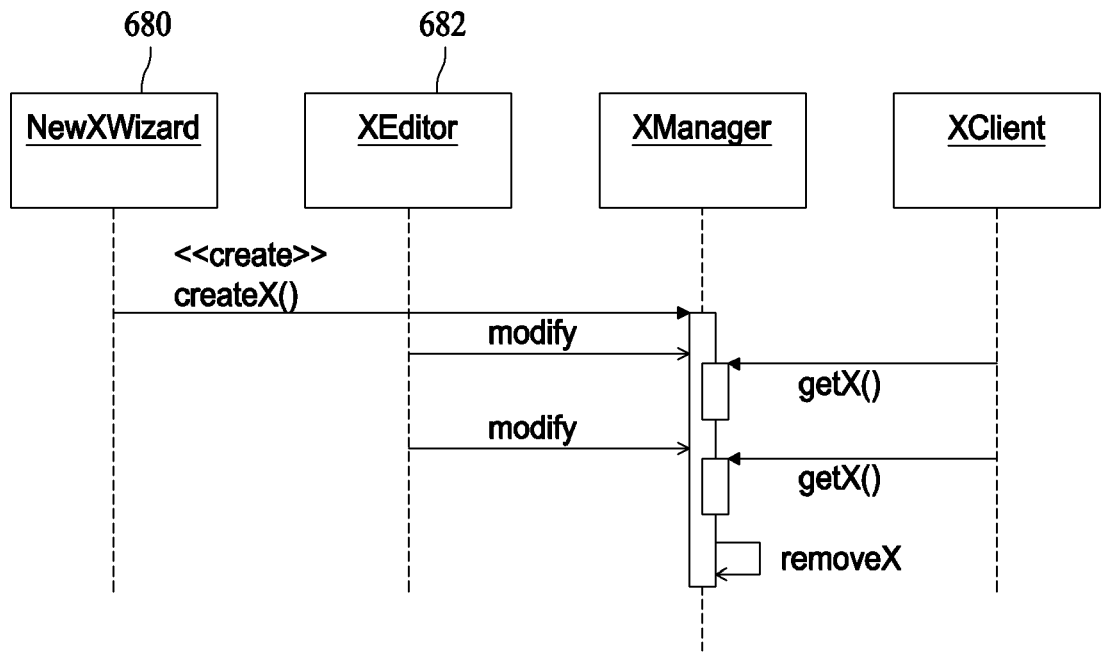
FIG. 20 illustrates sample steps to manage data sources, pattern destinations and tasks within a CMAP framework.

FIG. 20 illustrates sample steps to manage data sources, pattern destinations and tasks (represented by 'X'). Common management functions include creation, modification, access and removal. To best utilize the CMAP framework, different data sources, pattern destinations and tasks are created, modified, accessed, and removed independently. When a data source or pattern destination is used by a task, it cannot be modified or removed unless the task is removed or modified not to use it any more. In general, most user interface components, like the wizards 680 and editors 682, are executed in the same GUI thread.

Figure 21:
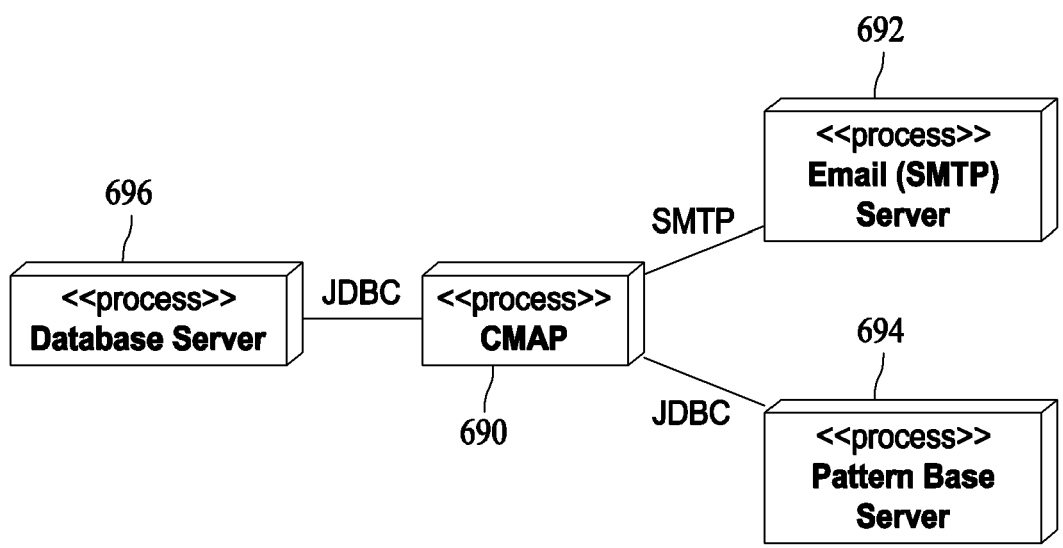
FIG. 21 illustrates that the CMAP framework is operable to send notifications to remote recipient agents.

To provide rich functionality and complex data mining algorithms, the CMAP framework 690 is deployed, in one embodiment, as a standalone application. The CMAP framework 690 may access data from remote data sources and save patterns into remote pattern repositories. The CMAP framework is also operable to send notifications to remote recipient agents, as illustrated in FIG. 21. An electronic mail server 692, a database server 694, and a pattern base server 696 can be also deployed in the same node as the CMAP framework 690.

Figure 22:
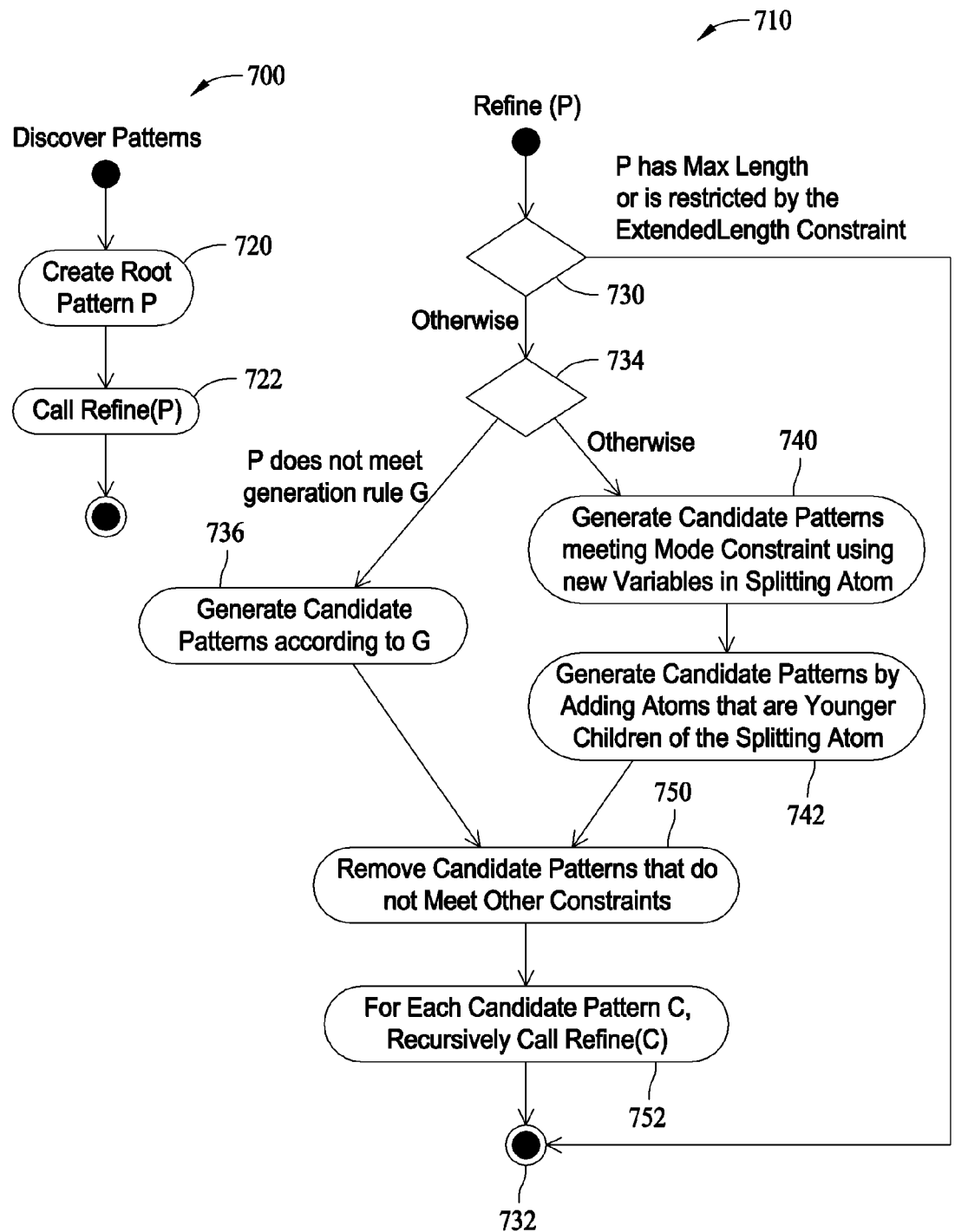
FIG. 22 includes flow diagrams illustrating operation of the CMAP mechanism to discover patterns meeting specified constraints.

FIG. 22 includes flowcharts 700 and 710 illustrating the CMAP mechanism, in one embodiment, to discover patterns meeting specified constraints. Referring to flowchart 700, the CMAP mechanism starts by creating 720 the root pattern P using the base (target) predicate, and then calling 722 the refine routine with the root pattern P.

Now referring to flowchart 710, the refine routine first checks 730 whether P already has the maximum length or is restricted by the ExtendedLength Constraint so that no candidate patterns can be generated from P. If so, the refine routine stops 732. Otherwise, the refine routine checks 734 whether there exists a Generation Rule Constraint that is not met by P. If so, the refine routine generates 736 candidate patterns according to the generation rule. Otherwise, the refine routine will first generate 740 candidate patterns meeting the Mode Constraint using new Variables in the splitting atom of P, and then generate 742 candidate patterns by adding atoms that are younger children of the splitting atom. The splitting atom of P is the atom in P directly follows the longest prefix, denoted $P_p$, of P that meet all Generation Rule constraints. The younger children of the splitting atom are the last atoms of those candidate patterns generated after $P_s$ in the invocation of refine($P_p$) where $P_s$ is the pattern comprising $P_p$ and the splitting atom.

Once all candidate patterns are generated, all other constraints including SyntacticFilter, SemanticFilter, ComplexConstraint, are checked 750 to remove candidate patterns that do not meet one or more constraints. For each candidate pattern not removed, the refine routine is recursively invoked 752 with that candidate pattern, and the refine routine stops 732.

While the invention has been described in terms of various specific embodiments, those skilled in the art will recognize that the invention can be practiced with modification within the spirit and scope of the claims.

What is claimed is:

1. A computer-based method of mining data to discover activity patterns within the data, said method comprising:
   receiving data to be mined at a computer framework from at least one data source communicatively coupled to the computer framework;
   determining which of a number of specified constraints are available for the mining task, the constraints including a syntactic filter constraint configured to utilize a sequence of modes to filter patterns and avoid generation of patterns with redundant atoms, a semantic filter constraint having a minimum frequency threshold, a sequence of modes and a Boolean expression on arguments in the modes, and at least one of a generation rule constraint, a maximum length constraint, an extended length constraint, and a complex constraint;
   selecting corresponding mining agents that combine search algorithms with propagators from at least one of the specified constraints;
   finding any activity patterns, using the computer framework, that meet at least one of the specified constraints, each activity pattern including one or more atoms, each atom defined on a predicate that includes one or more typed arguments; and
   analyzing the activity patterns, using the computer framework, found to meet at least one of the specified constraints.

2. A method according to claim 1 further comprising at least one of saving found activity patterns into one or more computer accessible data repositories and reporting found activity patterns to a user.

3. A method according to claim 1 further comprising at least one of evaluating and matching found activity patterns against newly received data for at least one of categorizing new activities and detecting abnormal activities.

4. A method according to claim 1 wherein receiving data to be mined further comprises representing the received data as facts from a number of logically represented first order predicates.

5. A method according to claim 1 wherein finding any activity patterns comprises representing the pattern as a conjunction of one or more first order predicates.

6. A method according to claim 1 wherein:
   receiving data to be mined from at least one data source comprises at least one of adding new data sources for mining, removing data sources from mining, and modifying data sources.

7. A method according to claim 1 further comprising at least one of creating and managing pattern mining tasks.

8. A method according to claim 7 wherein at least one of creating and managing pattern mining tasks further comprises at least one of starting pattern mining tasks, running pattern mining tasks, pausing pattern mining tasks, resuming pattern mining tasks, and canceling pattern mining tasks.

9. A method according to claim 1 wherein analyzing the activity patterns found to meet at least one of the specified constraints comprises at least one of filtering a set of patterns, ranking patterns according to specified attributes, and searching patterns in a pattern set having specific criteria.

10. A method according to claim 1 further comprising at least one of installing a plug in module into a platform, updating a plug in module, and removing a plug in module.

11. A method according to claim 1 further comprising:
    at least one of adding, removing, and modifying pattern destinations based on a configuration of the found activity patterns; and
    providing mining tasks based on a configuration of the pattern destinations.

12. A computer-based system for constraint-based mining of activity patterns within a framework, said system comprising:
    a data input;
    a plurality of data mining tools within the framework and operable to run on said system, said data mining tools configured to search data received at said data input for one or both of temporal and spatial patterns for activities of interest within one or more scenarios, each pattern including one or more atoms, each atom defined on a predicate that includes one or more typed arguments;
    a plurality of constraints, said constraints based on knowledge and experiences, and operable to cause said system to determine whether one or more patterns satisfies the said constraints, said constraints organized based on a subsumption relationship among the constraints and including a syntactic filter constraint configured to utilize a sequence of modes to filter patterns and avoid generation of patterns with redundant atoms, a semantic filter constraint having a minimum frequency threshold, a sequence of modes and a Boolean expression on arguments in the modes, and at least one of a generation rule constraint, a maximum length constraint, an extended length constraint, and a complex constraint; and
    at least one database configured for operation as a pattern repository.

13. A computer-based system according to claim 12 wherein said plurality of constraints comprises a mode constraint, said mode constraint configured to:
    specify permissions on each argument for a given predicate; and
    specify a maximum number of atoms matching a permission combination allowed in a pattern.

14. A computer-based system according to claim 12 wherein said generation rule constraint comprises:
    a sequence of modes as matching conditions; and
    a set of modes used to generate new atoms.

15. A computer-based system according to claim 12 wherein to search data received at said data input, said system is configured to:
    initialize the search by creating a single pattern using a target predicate; and
    invoke a refining process with the single pattern.

16. A computer-based system according to claim 15 wherein to invoke the refining process, said system is configured to stop the refining process if a maximum length is reached or if an extended length constraint cannot be met by the single pattern.

17. A computer-based system according to claim 15 wherein to invoke the refining process, said system is configured to:

generate candidate patterns according to the generation rule constraint if the single pattern does not meet at least one generation rule constraint; and generate candidate patterns according to mode constraints using variables introduced in a splitting atom, and generate candidate patterns by copying atoms that are younger children of the splitting atom if the single pattern meets all generation rule constraints.

18. A computer-based system according to claim 17 wherein said system is configured to:

remove from a candidate pattern set those candidate patterns that do not met at least one of a specified syntactic constraint, a semantic constraint, a generic data independent constraint, and a generic data dependent constraint; and recursively invoke the refining process for each candidate pattern in the candidate pattern set.

* * * * *